(12) United States Patent
Kiyoshige

(10) Patent No.: US 8,976,267 B2
(45) Date of Patent: Mar. 10, 2015

(54) IMAGE PICKUP DEVICE WITH PHOTOGRAPHY POSITIONING GUIDANCE

(75) Inventor: Ryuichi Kiyoshige, Tokyo (JP)

(73) Assignee: Olympus Corporation, Tokyo (JP)

( * ) Notice: Subject to any disclaimer, the term of this patent is extended or adjusted under 35 U.S.C. 154(b) by 348 days.

(21) Appl. No.: 13/440,208

(22) Filed: Apr. 5, 2012

(65) Prior Publication Data

US 2012/0257084 A1 Oct. 11, 2012

(30) Foreign Application Priority Data

Apr. 8, 2011 (JP) .................................. 2011-086284

(51) Int. Cl.
| | | |
|---|---|---|
| H04N 5/76 | (2006.01) | |
| H04N 5/225 | (2006.01) | |
| H04N 5/232 | (2006.01) | |
| H04N 9/82 | (2006.01) | |

(52) U.S. Cl.
CPC ......... *H04N 5/23222* (2013.01); *H04N 9/8233* (2013.01); *H04N 5/23293* (2013.01)
USPC ............. 348/231.99; 348/231.5; 348/207.991

(58) Field of Classification Search
USPC ................. 348/207.99, 231.99, 231.5, 231.9, 348/211.3, 220.1
See application file for complete search history.

(56) References Cited

U.S. PATENT DOCUMENTS

| | | | | |
|---|---|---|---|---|
| 7,027,823 B2 * | 4/2006 | Mikuni | ........................ | 455/457 |
| 7,728,869 B2 * | 6/2010 | Jung | ............................ | 348/113 |
| 8,040,421 B2 * | 10/2011 | Suehiro | ..................... | 348/333.02 |
| 2003/0032436 A1 * | 2/2003 | Mikuni | ........................ | 455/457 |
| 2009/0086047 A1 * | 4/2009 | Suehiro | ..................... | 348/222.1 |

FOREIGN PATENT DOCUMENTS

| | | |
|---|---|---|
| JP | 2002-010114 A | 1/2002 |
| JP | 2009-239397 A | 10/2009 |
| JP | 2010-063052 A | 3/2010 |
| JP | 2011-010133 A | 1/2011 |
| JP | 2012-090106 A | 5/2012 |

OTHER PUBLICATIONS

Japanese Office Action dated Dec. 9, 2014, issued in Japanese Patent Application No. 2011-086284; w/English Translation, (6 pages).

* cited by examiner

*Primary Examiner* — Ahmed A Berhan
(74) *Attorney, Agent, or Firm* — Westerman, Hattori, Daniels & Adrian, LLP

(57) ABSTRACT

An image pickup device may include a storage unit that maps photographing position information to at least two pieces of target direction information, and stores the mapped information; an acquisition unit that acquires apparatus position information and photographing direction information; a calculation unit that selects at least one from among the plurality of pieces of photographing position information stored in the storage unit based on the apparatus position information acquired by the acquisition unit, and calculates at least two direction differences that are differences between the at least two pieces of target direction information, which are mapped to the selected photographing position information and are stored in the storage unit, and the photographing direction information acquired by the acquisition unit; and a display unit that displays information corresponding to the at least two direction differences calculated by the calculation unit.

7 Claims, 12 Drawing Sheets

IMAGE PICKUP DEVICE WITH PHOTOGRAPHY POSITIONING GUIDANCE

BACKGROUND OF THE INVENTION

1. Field of the Invention

The present invention relates to an image pickup device having a function of guiding a photographer so as to enable more suitable photographing.

Priority is claimed on Japanese Patent Application No. 2011-086284, filed Apr. 8, 2011, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

A user can travel to a tourist spot or a scenic spot with a camera, and photograph a subject such as a temple, a castle, or natural scenery such as a mountain or a garden that is present there. With regard to the mentality of a traveler or a photographer, when he/she sees a subject directly after finally arriving at and entering a tourist spot such as a garden, his/her mood is elevated. As such, when the traveler or the photographer is overtaken with excitement with the subject which he/she first sees, takes photographs only there, and is satisfied with his/her photographing, he/she wants to move on to the next tourist point in a hurry, without regard to whether there is a more recommended photographing place in which the subject can be photographed in a more characteristic and clear manner. Then, when the traveler or the photographer reviews the photographs taken at that time, he/she frequently has a different impression such as that the photograph would show the subject larger or more clearly. The traveler or the photographer often regrets that he/she should have taken a photograph at another place or angle at that time.

Japanese Unexamined Patent Application, First Publication No. 2009-239397 discloses a method in which, to enable a photographer to take a photograph with a favorable composition even at a location that the photographer is visiting for the first time, based on information about a photographing position corresponding to a reference photograph obtained from a server and his/her own current position, a photographing device guides the photographer to the photographing position corresponding to the reference photograph, and instructs the photographing position based on a photographing state of the photographer so that a composition corresponding to the photographing state of the photographer is consistent with a composition of the reference photograph.

In the method of Japanese Unexamined Patent Application, First Publication No. 2009-239397, the photographer needs to manipulate the camera on the spot to search for a place suitable for photographing, obtain the reference photograph from the external server using a network line, and decide the composition for himself/herself based on the obtained reference photograph. When the photographer wants to take a photograph in a photographing direction different from that instructed by the reference photograph in the process of deciding the composition, the photographer needs to manipulate the camera again from selection of the reference photograph.

SUMMARY

An image pickup device may include: a storage unit that maps photographing position information indicating a photographing position of each of a plurality of photographing targets to at least two pieces of target direction information indicating directions of the photographing target based on the photographing position, and stores the mapped information; an acquisition unit that acquires apparatus position information indicating a position of the image pickup device and photographing direction information indicating a photographing direction of the image pickup device; a calculation unit that selects at least one from among the plurality of pieces of photographing position information stored in the storage unit based on the apparatus position information acquired by the acquisition unit, and calculates at least two direction differences that are differences between the at least two pieces of target direction information, which are mapped to the selected photographing position information and are stored in the storage unit, and the photographing direction information acquired by the acquisition unit; and a display unit that displays information corresponding to the at least two direction differences calculated by the calculation unit.

The calculation unit may calculate a position difference that is a difference between the selected photographing position information and the apparatus position information. The display unit may display information corresponding to the position difference calculated by the calculation unit.

The acquisition unit may obtain angle of view information indicating a photographing angle of view of the image pickup device. The calculation unit may select the at least one from among the plurality of pieces of photographing position information stored in the storage unit based on the apparatus position information and the angle of view information that are acquired by the acquisition unit.

The acquisition unit may include a geomagnetic sensor and an angular velocity sensor, measure the photographing direction of the image pickup device using the geomagnetic sensor and the angular velocity sensor, and acquire the photographing direction information.

The storage unit may store first angle of view information for each of the photographing targets. The acquisition unit may obtain second angle of view information indicating a photographing angle of view of the image pickup device. The calculation unit may calculate an angle of view difference that is a difference between the first angle of view information and the second angle of view information. The display unit may display information corresponding to the angle of view difference calculated by the calculation unit.

The storage unit may store date/time information for each of the photographing targets. The acquisition unit may acquire date/time information indicating a current date/time. The calculation unit may select the at least one from among the plurality of pieces of photographing position information stored in the storage unit based on the apparatus position information and the date/time information that are acquired by the acquisition unit.

A storage device may store a program that causes a device to serve as: a storage means for mapping photographing position information indicating a photographing position of each of a plurality of photographing targets to at least two pieces of target direction information indicating directions of the photographing target based on the photographing position, and stores the mapped information; an acquisition means for acquiring apparatus position information indicating a position of the image pickup device and photographing direction information indicating a photographing direction of the image pickup device; a calculation means for selecting at least one from among the plurality of pieces of photographing position information stored in the storage unit based on the apparatus position information acquired by the acquisition unit, and calculates at least two direction differences that are differences between the at least two pieces of target direction information, which are mapped to the selected photographing position information and are stored in the storage unit, and the photographing direction information acquired by the acquisition unit; and a display means for displaying information corresponding to the at least two direction differences calculated by the calculation unit.

According to the present invention, information corresponding to at least two direction differences is displayed with respect to at least one photographing target. Thereby, the photographer can select either one of the displayed two direction differences, and decide a composition.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE PREFERRED EMBODIMENTS

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated for explanatory purpose.

Usage Environment

Figure 1:
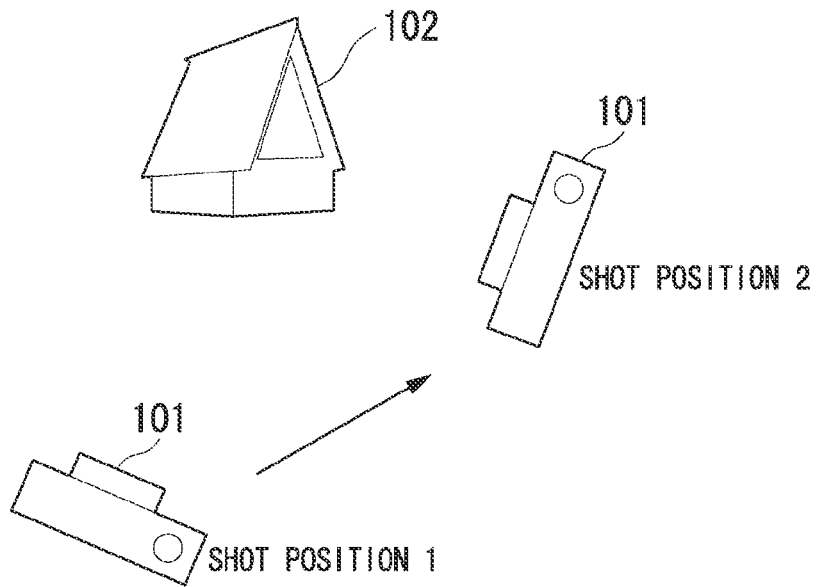
FIG. 1 is a reference diagram illustrating a photographing environment in accordance with a first preferred embodiment of the present invention.

FIG. 1 shows an environment in which a camera 101 is used as an example relating to the first preferred embodiment. There is a subject 102, and a photographer directs the camera 101 toward the subject 102 from a photographing position 1, and attempts to photograph the subject 102. However, it is often known that, in tourist spots or scenic places, a better result can be obtained by photographing the subject 102 from another photographing position 2 than by photographing the subject 102 from the photographing position 1. It is shown in FIG. 1 that the camera 101 guides the photographer to move from the photographing position 1 to the photographing position 2, and according to the guidance, the photographer moves from the photographing position 1 to the photographing position 2, directs the camera 101 toward the subject 102, and photographs the subject 102.

Configuration of Camera

Figure 2:
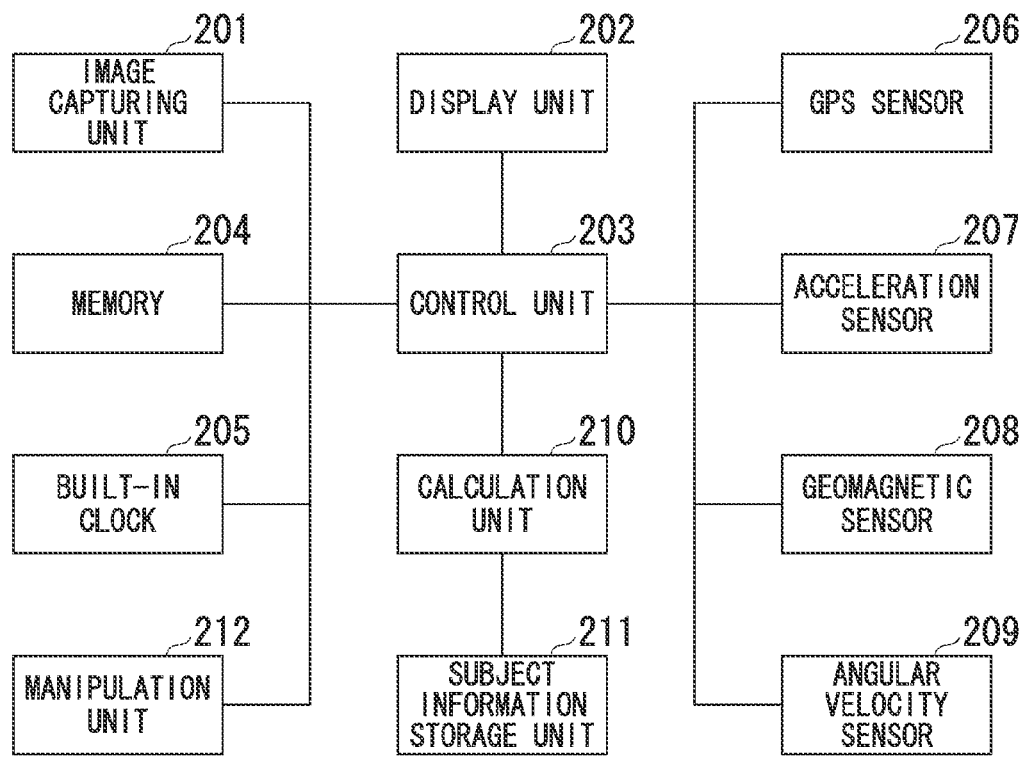
FIG. 2 is a block diagram illustrating a configuration of a camera in accordance with the first preferred embodiment of the present invention.

FIG. 2 shows a configuration of the camera 101. The camera 101 includes an image capturing unit 201, a display unit 202, a control unit 203, a memory 204, a built-in clock 205, a GPS sensor 206, an acceleration sensor 207, a geomagnetic sensor 208, an angular velocity sensor 209, a calculation unit 210, a subject information storage unit 211, and a manipulation unit 212. The image capturing unit 201 is equipped with an image capturing lens and an image capturing sensor, photographs a subject, and generates image data. The display unit 202 displays information for notifying a photographer of a photographing position and a photographing direction, in addition to displaying an image based on the image data obtained by the image capturing unit 201.

The control unit 203 controls the entire system of the camera 101. The memory 204 records the image data obtained by the image capturing unit 201. The built-in clock 205 provides an operation cycle acting as a criterion used when the entire system operates, and provides information on a date or a time. The GPS sensor 206 receives information transmitted from a GPS satellite on radio waves, and obtains a current position of the camera 101.

The acceleration sensor 207 measures accelerations of the camera 101 in forward/backward, leftward/rightward, and upward/downward directions. The geomagnetic sensor 208 measures east-west and north-south directions based on a geomagnetic direction of the earth. The angular velocity sensor 209 measures a three-dimensional spatial posture of the camera 101. The calculation unit 210 carries out a variety of operations based on the various pieces of information obtained from the GPS sensor 206, the acceleration sensor 207, the geomagnetic sensor 208, the angular velocity sensor 209, the subject information storage unit 211, the image capturing unit 201, and the control unit 203.

The subject information storage unit 211 is a database in which information about the subject including information about a position of the subject, a photographing position of the subject, a photographing direction of the subject, and the like is recorded. The information recorded as the subject information is, for example, photographing information collected when a professional takes a photograph, or collected and previously recorded photographing information of photographs contributed through an Internet service, etc. by tourists who visit a tourist spot or a scenic spot. The manipulation unit 212 includes a release button or a switch manipulated by a user (photographer).

Information about Subject

Figure 16:
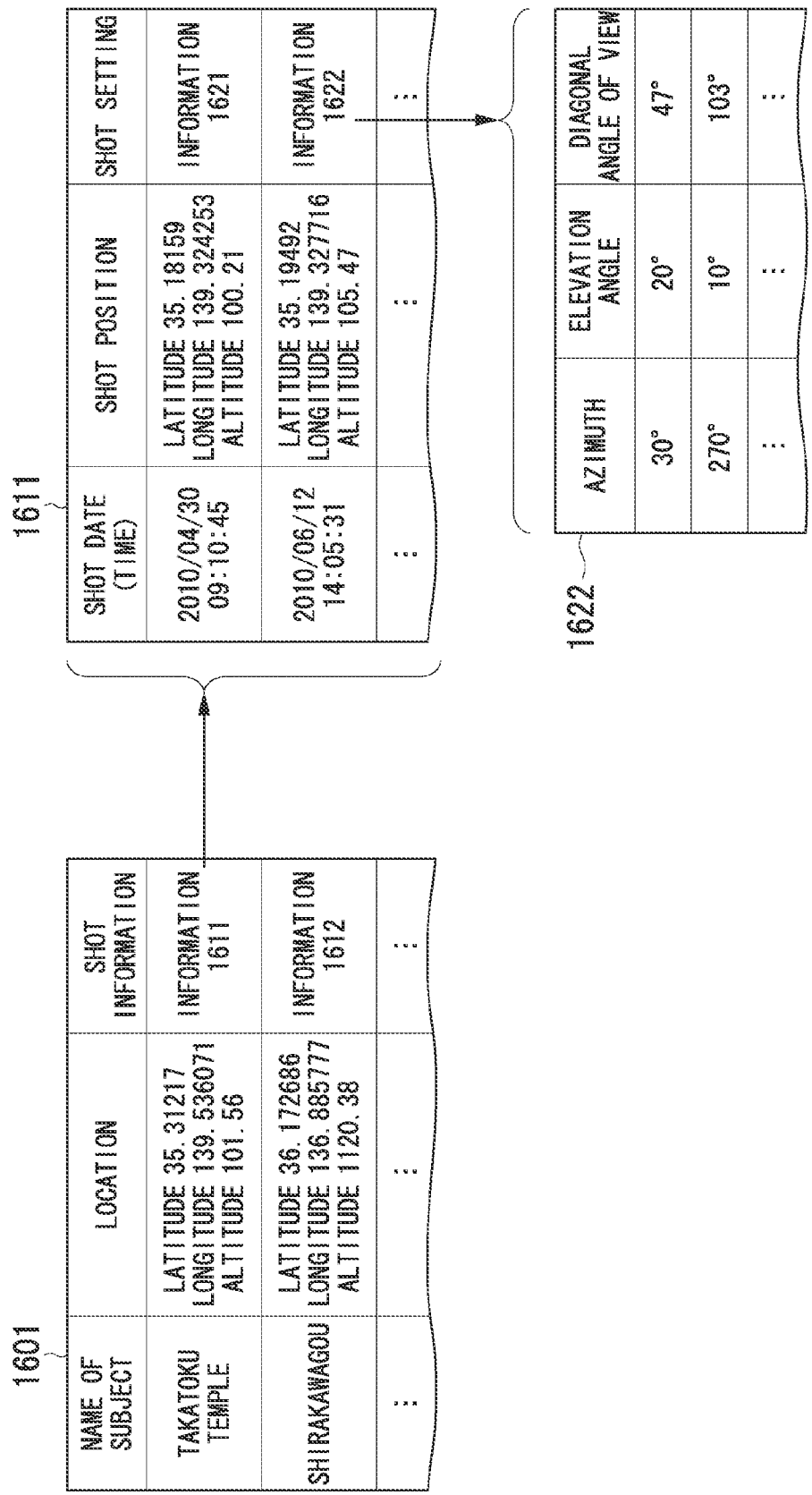
FIG. 16 is a reference diagram illustrating information about a subject in the first preferred embodiment of the present invention.

Detailed information about the subject will be described with reference to FIG. 16. As information 1601 of FIG. 16 shows, information about a position of the subject is recorded in the subject information storage unit 211 in relation to a name and photographing information of the subject with a latitude, a longitude, and an altitude adopted as information about a location. The photographing information is associated with each subject. In FIG. 16, information 1611 and information 1612 that are the two pieces of photographing information corresponding to the two subjects are included. The pieces of photographing information represent the photographing date (time), and the photographing position of the previous photographing.

The information 1611 as the photographing information is information associated with the information of each subject of the information 1601. As the information 1611 shows, a plurality of photographing dates (times), a photographing position (photographing position information) corresponding to each photographing date (time), and photographing setting corresponding to each photographing date (time) are recorded with respect to a certain subject. The photographing setting represents a photographing direction and an angle of view of the previous photographing. The photographing setting is associated with each photographing date (time). In FIG. 16, information 1621 and information 1622 are included in the photographing setting. An azimuth and an elevation angle of a camera optical axis (information about a target direction) when photographing is performed at the associated photographing position, and an angle of view when the photographing is performed are recorded in plural in the information 1622 as the photographing setting.

Periodical Operation of Camera

Figure 3:
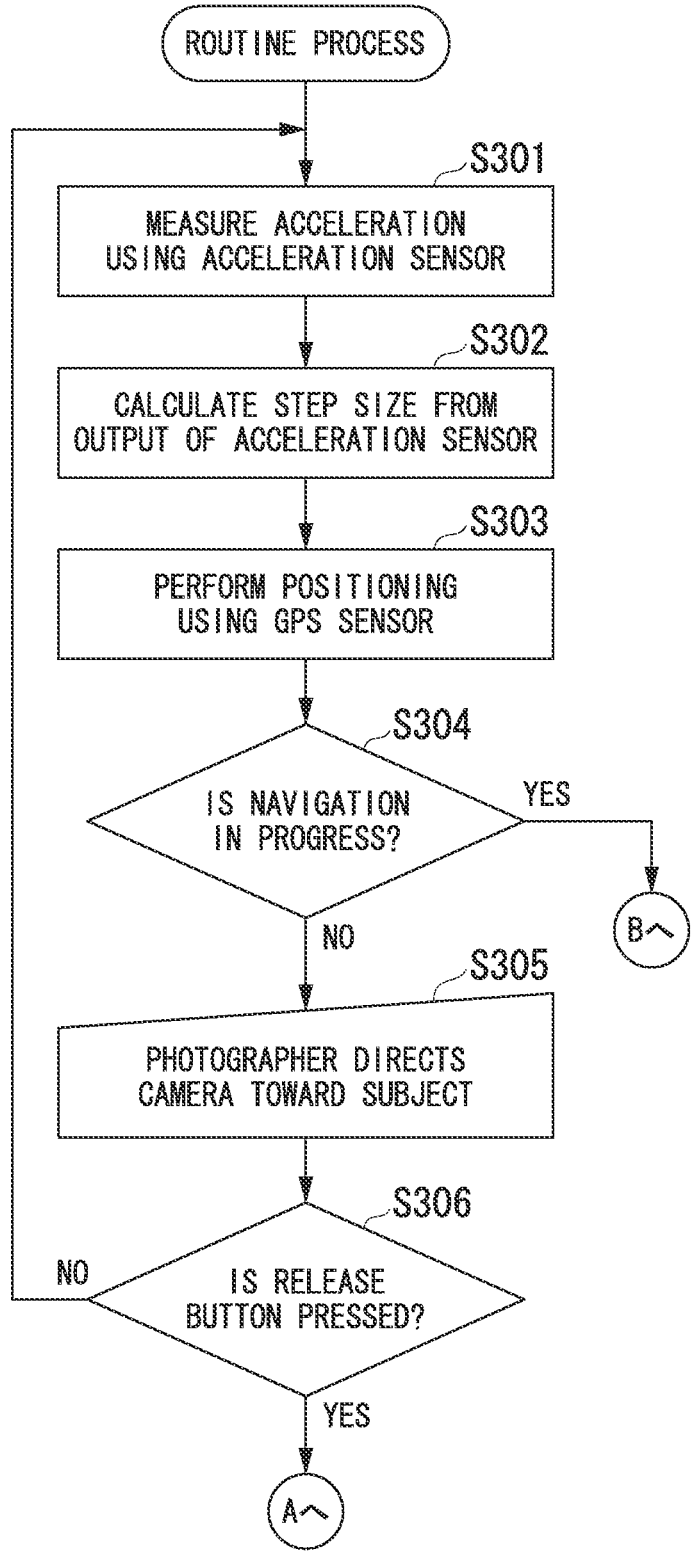
FIG. 3 is a flowchart illustrating a procedure of operation of the camera in accordance with the first preferred embodiment of the present invention.

Fundamental operations of the camera 101 will be described with reference to FIG. 3. In the first preferred embodiment, the camera 101 guides a photographer to a suitable photographing position. The camera 101 first conducts a process to be described below in order to conduct the guidance.

First, the acceleration sensor 207 measures an acceleration of the camera 101 (step S301). The measurement is always made while the camera 101 is in operation.

The calculation unit 210 calculates the step size of the photographer based on information about the acceleration output from the acceleration sensor 207 (step S302). As the step size calculating method, a change in a vertical acceleration of the acceleration sensor 207 is measured first, and the acceleration change is estimated to be responsible for upward/downward movement when the photographer walks. Then, a cycle of one step is calculated from the acceleration change. Further, an acceleration of the direction of forward movement is measured, and is integrated by the cycle of one previously obtained step. Thereby a movement speed and a step size can be obtained.

The process is continuously performed, and the average of calculated results is taken. Thereby, the step size having higher precision can be obtained. Further, a threshold value (e.g., less than 2 km/h) of the movement speed of the photographer is previously defined, and the speed is obtained from the acceleration of the direction of forward movement. If the obtained speed is less than the threshold value, it may not be used to calculate the step size.

Subsequently, the GPS sensor 206 conducts positioning to obtain information about a current position of the camera 101 (apparatus position information) (step S303). Then, the control unit 203 determines whether or not the camera 101 is guiding the photographer to a suitable photographing position at present (step S304).

Figure 5:
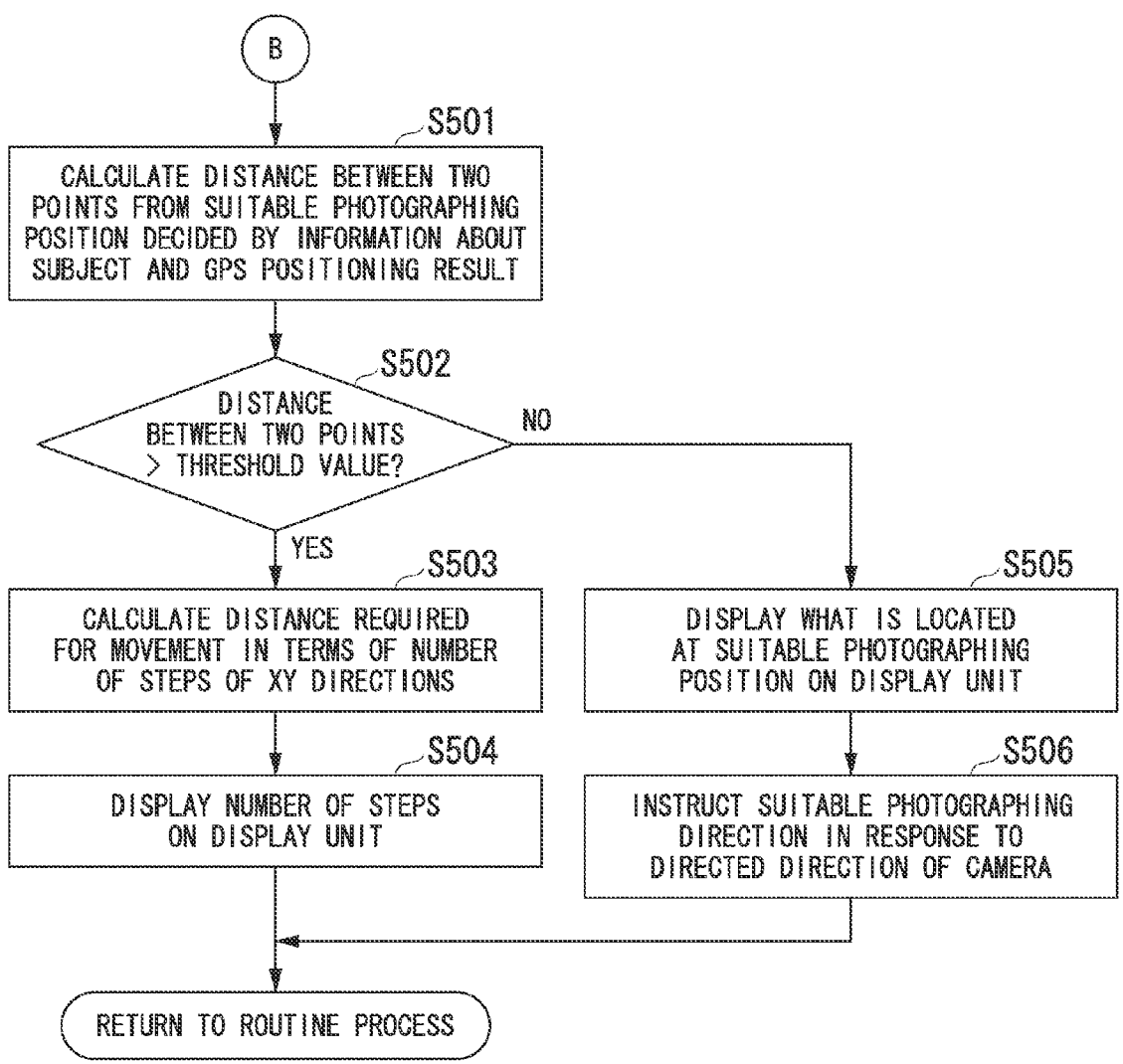
FIG. 5 is a flowchart illustrating a procedure of operation of the camera in accordance with the first preferred embodiment of the present invention.

If the camera 101 guides the photographer to the suitable photographing position, the process goes to step S501 of FIG. 5. The following description will be made regarding the case in which the camera 101 does not guide the photographer to the suitable photographing position. The photographer points the camera 101 at a subject which he/she wants to photograph in order to photograph the subject, and performs framing (step S305). The control unit 203 determines whether or not the photographer carries out a photographing operation by pressing the release button after performing the framing, based on the signal output from the manipulation unit 212 (step S306). If the photographing operation is not carried out, the process returns to step S301.

Further, the photographing operation used herein refers to, for example, an act that corresponds to a first release in which the release button generally provided on the camera 101 is gently pressed in order to conduct autofocus. When the release button is deeply pressed, this becomes a second release, resulting in pressing the shutter. The aforementioned process is executed inside the camera 101 periodically or continuously.

In step S306, when the photographer presses the release button of the camera 101 to conduct the photographing operation, the camera 101 conducts a process of deciding a target subject and a process of selecting a suitable photographing position, both of which will be described below.

Decision of Subject and Selection of Shot Position

The case in which the photographer conducts the photographing operation will be described with reference to FIG. 4. First, the calculation unit 210 finds a direction in which the camera 101 is pointed (photographing direction information) based on the measured results from the geomagnetic sensor 208 and the angular velocity sensor 209 (step S401).

In greater detail, the calculation unit 210 obtains a geomagnetic direction in which the camera 101 is pointed from the output of the geomagnetic sensor 208, and obtains an azimuth, from a difference between the obtained geomagnetic direction and the direction of the optical axis of the camera 101. Further, the calculation unit 210 obtains an inclination of the camera 101 with respect to a gravitational direction from the output of the angular velocity sensor 209, thereby obtaining an elevation angle of the optical axis direction of the camera 101.

Subsequently, the control unit 203 obtains a current focal length (amount of zoom) of the lens of the camera 101 (step S402). Further, if the camera 101 is a type in which the focal length is changed by power zoom (in which the photographer manipulates the button of the camera to electrically shift the focal length of the lens), the control unit 203 obtains the focal length from its own control information. Further, if the camera is a type in which the amount of zoom is changed while the photographer is rotating a helicoid part of the lens, the control unit 203 obtains a focal length of the image capturing unit 201 from the image capturing unit 201.

The calculation unit 210 obtains an angle of view from the focal length obtained by the control unit 203 in consideration of the size of the image capturing sensor installed in the image capturing unit 201 (step S403). Here, a method of obtaining the angle of view will be described. The angle of view includes what are known as a vertical angle of view, a horizontal angle of view, and a diagonal angle of view. In the first preferred embodiment, to extract the subject included in a space projected onto an image capturing plane of the image capturing sensor of the image capturing unit 201, the vertical angle of view and the horizontal angle of view are obtained from the focal length.

Figure 13:
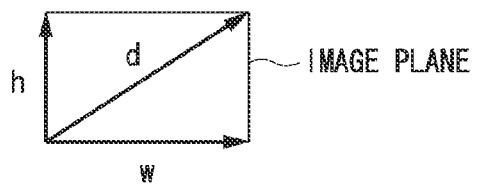
FIG. 13 is a reference diagram illustrating an angle of view of an image capturing sensor in the first preferred embodiment of the present invention.

When there is an image capturing sensor as shown in FIG. 13, an angle of view $\theta_x$ (x=h, w, d) is obtained as in Expression (1).

$$\theta_x = (180/\pi) \times 2 \tan^{-1}(x/2f) \text{ [deg]} \quad (1)$$

where x=h, w, d
f=focal length
$\theta_h$=vertical angle of view
$\theta_w$=horizontal angle of view
$\theta_d$=diagonal angle of view In this way, a desired angle of view can be obtained. Next, a process shown in FIG. 4 will be described. After the angle of view is calculated, the control unit 203 extracts a subject present at a photographing target region (a three-dimensional space acting as a photographing target), from the subject information storage unit 211 based on a current position of the camera 101, and a current optical axis direction (azimuth and elevation angle) and a current angle of view of the camera 101, and decides the subject adjacent to the current position as the photographing target subject (step S404).

Figure 9:
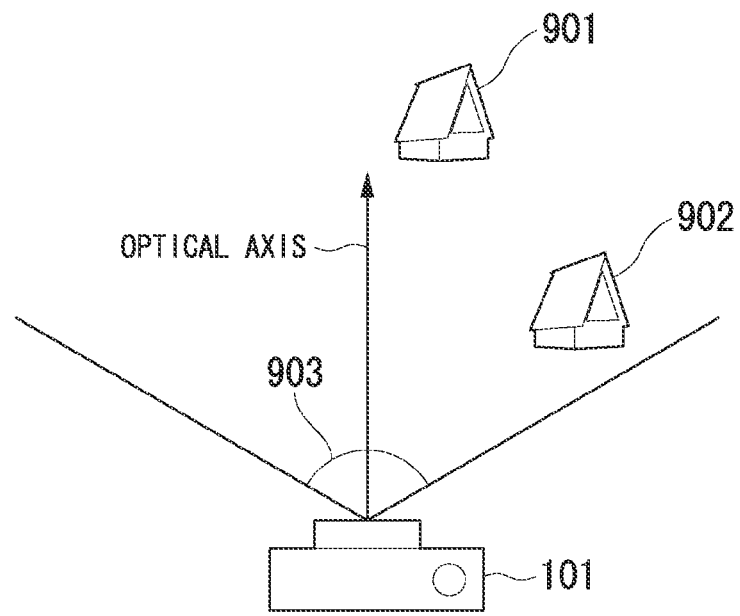
FIG. 9 is a reference diagram illustrating an angle of view of an azimuth direction in the first preferred embodiment of the present invention.
Figure 10:
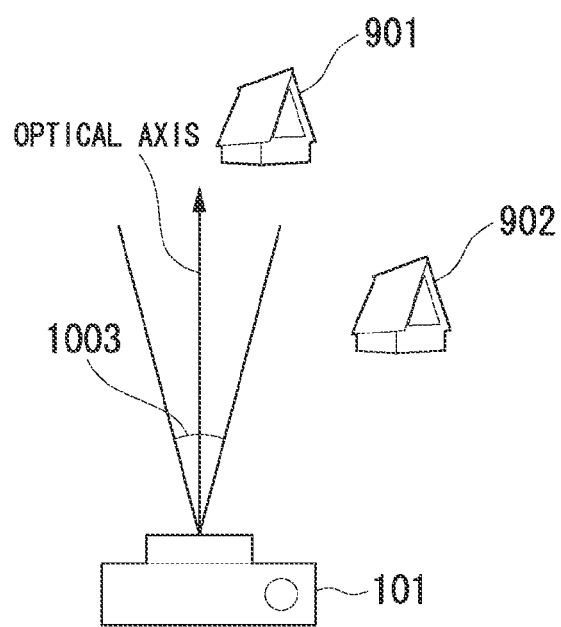
FIG. 10 is a reference diagram illustrating an angle of view of an azimuth direction in the first preferred embodiment of the present invention.

The photographing target region obtained from the optical axis direction (azimuth and elevation angle) and angle of view to which the camera 101 is directed will be described with reference to FIGS. 9, 10, 11 and 12. In FIGS. 9 and 10, the angle of view of an azimuth direction is shown. In FIG. 9, the angle of view of the camera 101 is set as an angle of view 903. In this case, the camera 101 adopts a region including subjects 901 and 902 as the photographing target region. This region decided according to the angle of view of the camera 101 is called the photographing target region.

Here, as shown in FIG. 10, the case in which the angle of view of the camera 101 is set as an angle of view 1003 is taken into account. The subject 902 is included in the photographing target region in FIG. 9, but not in FIG. 10.

Figure 11:
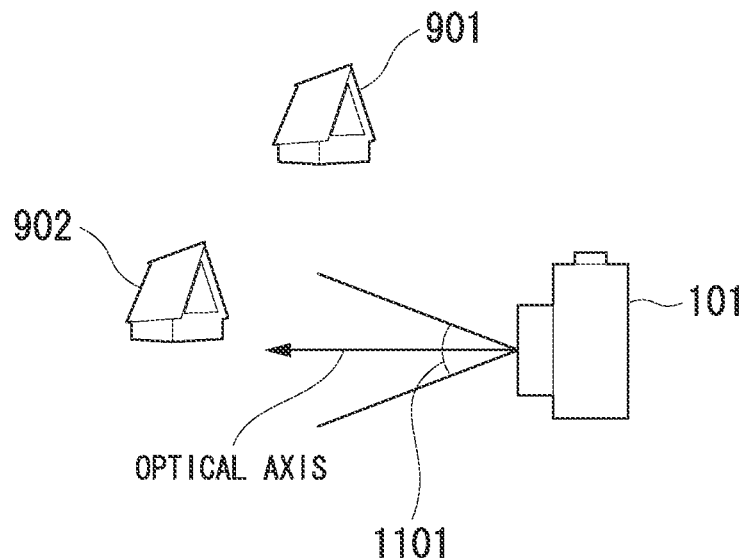
FIG. 11 is a reference diagram illustrating an angle of view of an elevation angle direction in the first preferred embodiment of the present invention.
Figure 12:
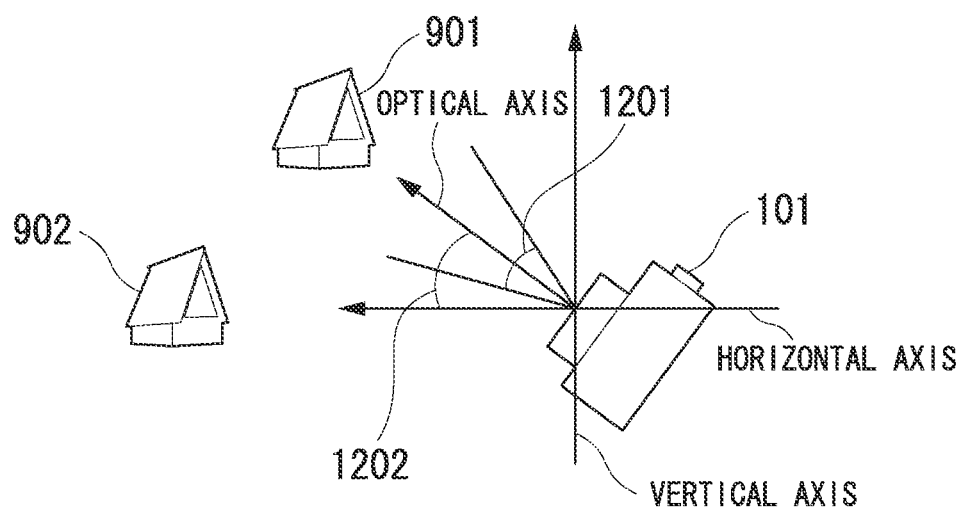
FIG. 12 is a reference diagram illustrating an angle of view of an elevation angle direction in the first preferred embodiment of the present invention.

FIGS. 11 and 12 show the angle of view in an elevation angle direction. In FIG. 11, the angle of view of the camera 101 becomes like an angle of view 1101, and the photographing target region includes only the subject 902, but not the subject 901. As in FIG. 12, when an optical axis direction of the camera 101 is inclined with an elevation angle 1202, the angle of view of the camera 101 becomes an angle of view 1201, and the subject 901 is adapted to be included in the photographing target region. In this way, the control unit 203 obtains the photographing target region, and extracts the subject included in the photographing target region.

Process of Deciding Shot Target Subject

Figure 6:
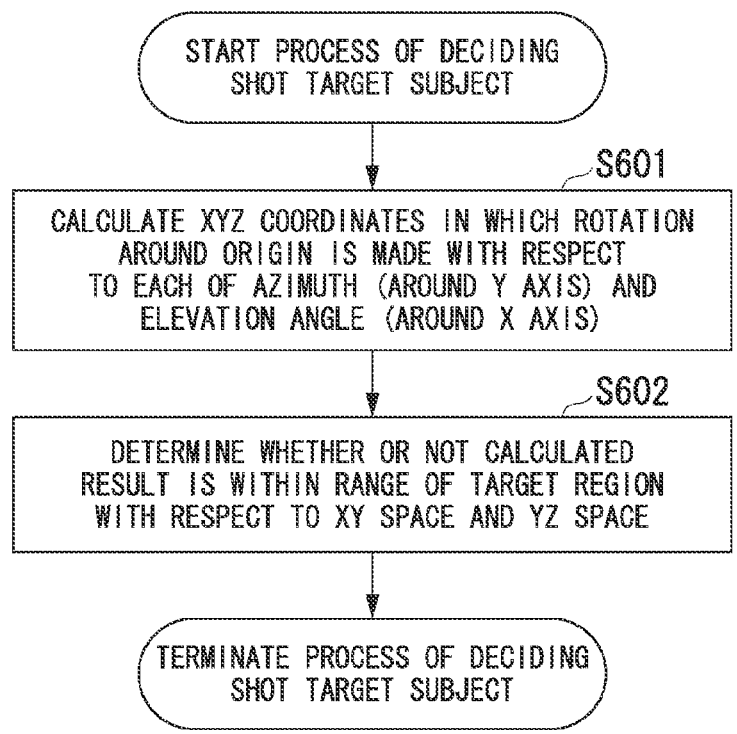
FIG. 6 is a flowchart illustrating a procedure of operation of the camera in accordance with the first preferred embodiment of the present invention.

Greater details of the process shown in step S404 of FIG. 4 will be described with reference to FIG. 6. First, the control unit 203 reads out position information of a subject from the subject information storage unit 211, and outputs the read position information to the calculation unit 210. The calculation unit 210 converts the position information received from the control unit 203 into planar rectangular coordinates, for example, using conversion of planar rectangular coordinates into longitude and latitude, which can be found on the web site http://vldb.gsi.go.jp/sokuchi/surveycalc/algorithm.

Here, longitude and latitude information in which the location of the information 1601 of FIG. 16 indicates is converted into the planar rectangular coordinates, and the converted coordinates are used. The calculation unit 210 further converts the coordinates, which have been obtained by the conversion, into coordinates whose origin is located at a current position of the camera 101. Subsequently, the calculation unit 210 rotates the coordinates whose origin is the current position of the camera 101 with respect to each of the azimuth (around the Z axis) and the elevation angle (around the X axis), and calculates coordinates (X', Y', Z') in a coordinate system in which the direction of the optical axis of the camera 101 is set to a reference direction, and which is fixed to the camera 101 (step S601).

The calculation method uses a linear transformation equation of rotational movement which is generally known. Hereinafter, Arithmetic Expressions (2) and (3) for the rotation around the axes are shown.

$$\text{Rotation around } X \text{ axis} \quad \begin{bmatrix} X' \\ Y' \\ Z' \end{bmatrix} = \begin{bmatrix} 1 & 0 & 0 \\ 0 & \cos\theta & -\sin\theta \\ 0 & \sin\theta & \cos\theta \end{bmatrix} \begin{bmatrix} X \\ Y \\ Z \end{bmatrix} \quad (2)$$

$$\text{Rotation around } Z \text{ axis} \quad \begin{bmatrix} X' \\ Y' \\ Z' \end{bmatrix} = \begin{bmatrix} \cos\theta & -\sin\theta & 0 \\ \sin\theta & \cos\theta & 0 \\ 0 & 0 & 1 \end{bmatrix} \begin{bmatrix} X \\ Y \\ Z \end{bmatrix} \quad (3)$$

The control unit 203 receives the calculated results from the calculation unit 210, and determines whether or not the calculated results are within the range of the photographing target region of the camera 101 (step S602). This determination method will be described with reference to FIGS. 14 and 15.

Figure 14:
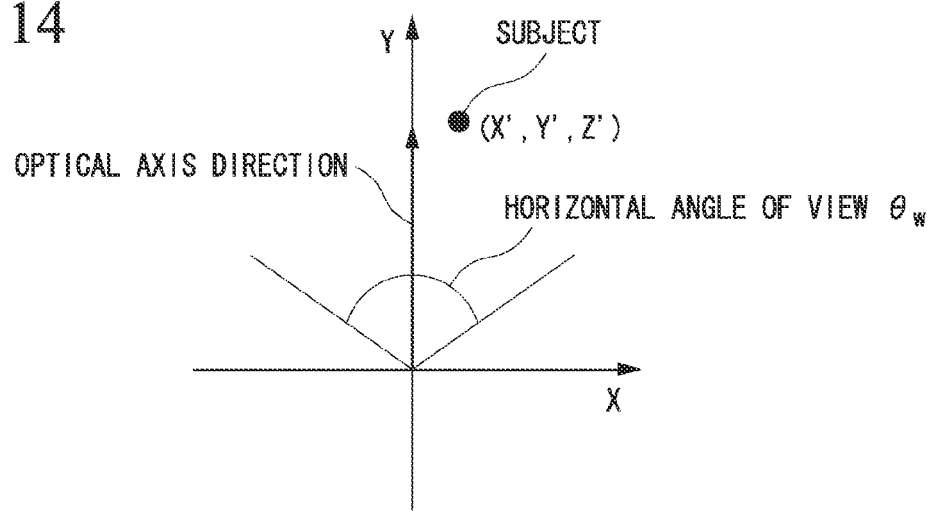
FIG. 14 is a reference diagram illustrating a photographing target region in the first preferred embodiment of the present invention.

FIG. 14 shows the photographing target region of the camera 101 using an XY plane. The angle of view used in this case is the horizontal angle of view $\theta_w$. The camera 101 is located at the origin, and the direction of the optical axis of the camera 101 is directed to the Y axis. When the coordinates after the transformation of the subject are (X', Y', Z'), the control unit 203 determines whether or not Expression (4) is satisfied.

Figure 15:
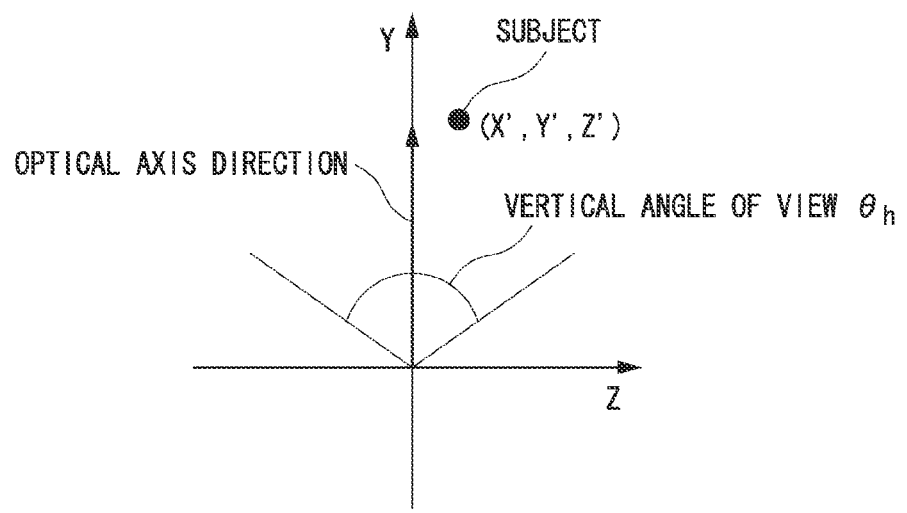
FIG. 15 is a reference diagram illustrating a photographing target region in the first preferred embodiment of the present invention.

FIG. 15 shows the photographing target region of the camera 101 using a YZ plane. The angle of view used in this case is the vertical angle of view $\theta_h$. The camera 101 is located at the origin, and the direction of the optical axis of the camera 101 is directed to the Y axis. When the coordinates after the transformation of the subject are (X', Y', Z'), the control unit 203 determines whether or not Expression (5) is satisfied.

$$Y' \geq X' \tan(90-(\theta_w/2)))(X' \geq 0)$$

$$Y' \geq X' \tan(90+(\theta_w/2)))(X' < 0) \quad (4)$$

$$Y' \geq Z' \tan(90-(\theta_w/2)))(Z' \geq 0)$$

$$Y' \geq Z' \tan(90+(\theta_w/2)))(Z' < 0) \quad (5)$$

When Expressions (4) and (5) are satisfied by the calculation above, it is possible to determine that the subject is within the photographing target region. The control unit 203 uses the determined result of the subjected included in the photographing target region, and when a plurality of subjects included in the photographing target region are extracted, decides the subject nearest the current position of the camera 101 to be the photographing target subject.

Next, the process shown in FIG. 4 will be described. The control unit 203 obtains information about current date and time from the built-in clock 205 of the camera 101 (step S405). Subsequently, to extract the photographing position from the information about the subject based on the information about current date and time from the built-in clock 205 and the current position, the control unit 203 decides search conditions of the information about the subject, and decides a suitable photographing position from the search result (step S406).

Process of Deciding Shot Position

Details of step S406 will be described with reference to FIG. 7. First, the control unit 203 extracts information in which photographing month and time are consistent with current date and time from the photographing information of the photographing target subject as shown in the information 1611 of FIG. 16, among the information about the subject stored in the subject information storage unit 211 (step S701).

As a detailed extraction method, the control unit 203 extracts information about a month equal to a current month of a year-month-day system from the information 1611. Subsequently, the control unit 203 extracts information about a time equal to that of a time with the current time indicated in the extracted information. Thereby, information in which the month when the photographing is performed is consistent with the current month and in which the time when the photographing was performed is consistent with the current time is extracted.

Further, as the search conditions, categories may be set, for example, in such a way that winter is from December to February, spring is from March to May, summer is from June to August, and autumn is from September to November, and information may be extracted by comparing the current date with the date of the photographing date (time). For example, if the current date is March 20th, the category of the current date is spring, and thus information in which the photographing date (time) is included in March to May is extracted.

Further, in terms of the time, categories may be set in such a way that morning is from 5:00 to 8:00, forenoon is from 9:00 to 12:00, afternoon is from 13:00 to 16:00, evening is from 17:00 to 20:00, night is from 21:00 to 24:00, and late night is from 1:00 to 4:00, and information may be extracted by comparing the current time with the time of the photographing date (time). For example, if the current time is 15:00, the category of the current time is afternoon, and thus information in which the time of the photographing date (time) is included in 13:00 to 16:00 is extracted.

The control unit 203 compares the photographing position associated with the photographing information extracted in this way, and decides a photographing position nearest the current position to be a photographing position of the photographing target (step S702). The process above is able to extract information about a suitable photographing position from the information about the subject, and to decide the photographing target.

Shot Instruction after Guidance to and Arrival at Suitable Shot Position

A method of deciding a suitable photographing position and then guiding a photographer to the photographing position will be described with reference to FIG. 5. The calculation unit 210 receives the suitable photographing position (photographing position information) decided in step S406 and the information about the current position (apparatus position information) of the camera 101 from the control unit 203, and calculates a distance between two points of these positions (position difference) (step S501). The control unit 203 compares the distance between the two points calculated by the calculation unit 210 with a threshold value, and determines whether or not the distance between the two points is within a range of error (step S502).

The threshold value is an acceptable error of the photographing position. A value is previously set for the camera 101 so as to determine that the distance between the two points is within the range of error, for example, if the distance between the two points is within 3 meters according to positioning precision of the GPS sensor 206. If the obtained distance between the two points is beyond the range of the threshold value, guidance up to the suitable photographing position is required. As such, the calculation unit 210 calculates coordinates of the X and Y axial directions on the XY coordinates whose origin is the current position of the camera 101 and in which the optical axis of the camera 101 is adopted as a reference based on the suitable photographing position using the method described with reference to FIG. 6. Since the obtained coordinates are distances of X and Y components from the origin (the current position of the camera 101), the calculation unit 210 divides the distance by the step size of the photographer obtained in step S202 of FIG. 3, and finds the number of steps of the X and Y components (step S503).

Figure 17:
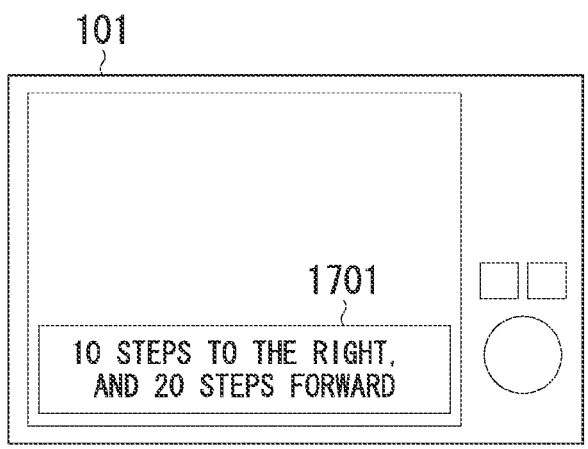
FIG. 17 is a reference diagram illustrating a guiding method in the first preferred embodiment of the present invention.

The control unit 203 receives the obtained number of steps from the calculation unit 210, and displays the number of steps on the display unit 202 (step S504). A method of displaying the number of steps on the display unit 202 will be described with reference to FIG. 17. In the display unit 202, a guide display part 1701 is set as a guide display region, displays a message illustrating, for example, "10 steps to the right and 20 steps forward" as shown in FIG. 17. The camera 101 guides the photographer through this display.

Next, the description of the process shown in FIG. 5 will be returned to. If the distance between the two points is found to be within the range of the threshold value as a result of the determination of step S502 of FIG. 5, the camera 101 is located at the suitable photographing position, and thus the control unit 203 displays information informing the photographer that the camera is located at the suitable photographing position, on the display unit 202 (step S505). Subsequently, a process of informing the photographer of a suitable photographing direction, and directing the optical axis of the camera 101 in the photographing direction is performed (step S506).

Figure 18:
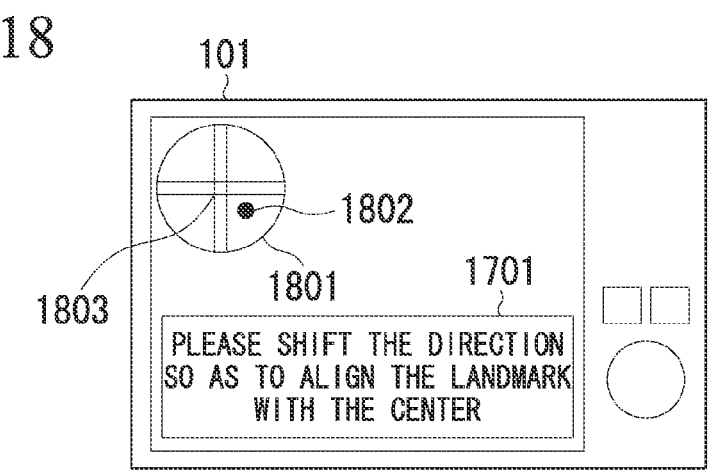
FIG. 18 is a reference diagram illustrating a guiding method in the first preferred embodiment of the present invention.

Here, a method of, after the photographer arrives at the suitable photographing position, informing the photographer that it is good to perform photographing in any direction will be described with reference to FIG. 18. The control unit 203 displays information informing of arrival at the suitable photographing position, on the display unit 202, and displays a direction indication 1801 on the display unit 202. The direction indication 1801 sets the optical axis of the camera 101 as the center 1803, and shows a landmark 1802 that shows a direction in which the photographing target is present.

Figure 19:
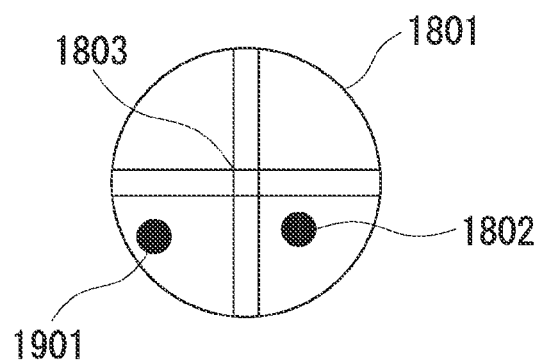
FIG. 19 is a reference diagram illustrating a guiding method in the first preferred embodiment of the present invention.

FIG. 19 shows details of the direction indication 1801. When the center 1803 is set as the optical axis of the camera 101, the direction indication 1801 shows that a leftward/rightward direction is an azimuth, and that an upward/downward direction is an inclination (elevation angle) of the camera 101. In FIG. 19, the landmark 1802 and a landmark 1901 regarding the same photographing target are shown. To cause the landmark 1802 or the landmark 1901 to arrive at the center 1803, the photographer can change the direction of the optical axis of the camera 101, and direct the direction of the optical axis of the camera 101 toward the direction of the subject of the photographing target.

As the information 1622 of FIG. 16 shows, a plurality of photographing directions may be recorded with respect to the same photographing position. In this case, as shown in FIG. 19, a plurality of landmarks are displayed within the direction indication 1801. That is, the plurality of photographing directions are instructed with respect to the same photographing target, and the photographer selects any one from the plurality of photographing directions, and performs photographing. This means that the photographer can adopt the plurality of landmarks displayed within the direction indication 1801 as a guideline, perform desired framing while looking at a finder depending on a seasonal change at the photographing position at which he/she has arrived, and perform photographing.

Process of Instructing Shot Direction

Figure 8:
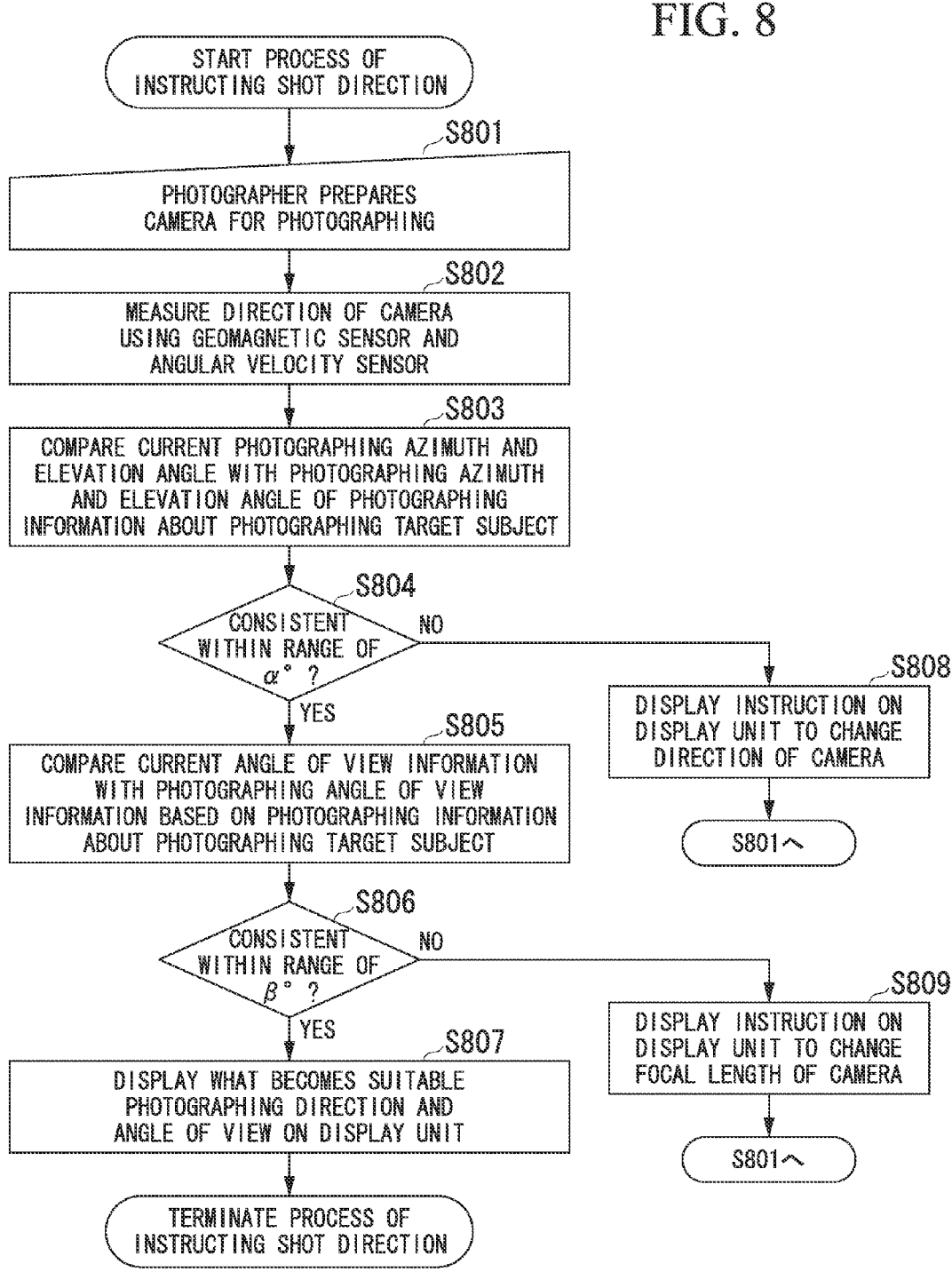
FIG. 8 is a flowchart illustrating a procedure of operation of the camera in accordance with the first preferred embodiment of the present invention.

In step S506, a detailed process of directing the direction of the optical axis of the camera 101 toward the subject of the photographing target will be described with reference to FIG. 8. First, the photographer prepares the camera 101 to photograph a subject (step S801). In this case, the direction of the optical axis of the camera 101 need not necessarily be a direction of the subject. Further, when the photographer prepares the camera 101, he/she may change the direction of the optical axis of the camera 101, or change the angle of view (focal length).

Subsequently, the calculation unit 210 finds a direction in which the camera 101 is directed at present based on the results measured by the geomagnetic sensor 208 and the angular velocity sensor 209 (step S802).

A method of finding the direction in which the camera 101 is directed at present is similar to the method used in step S401. The calculation unit 210 compares the found direction of the optical axis of the camera 101 (the azimuth and the elevation angle) with the azimuth and the elevation angle included in the photographing information of the subject of the photographing target decided in step S406 of FIG. 4 and in the process of FIG. 7, and calculates a difference between them (direction difference) (step S803).

Figure 4:
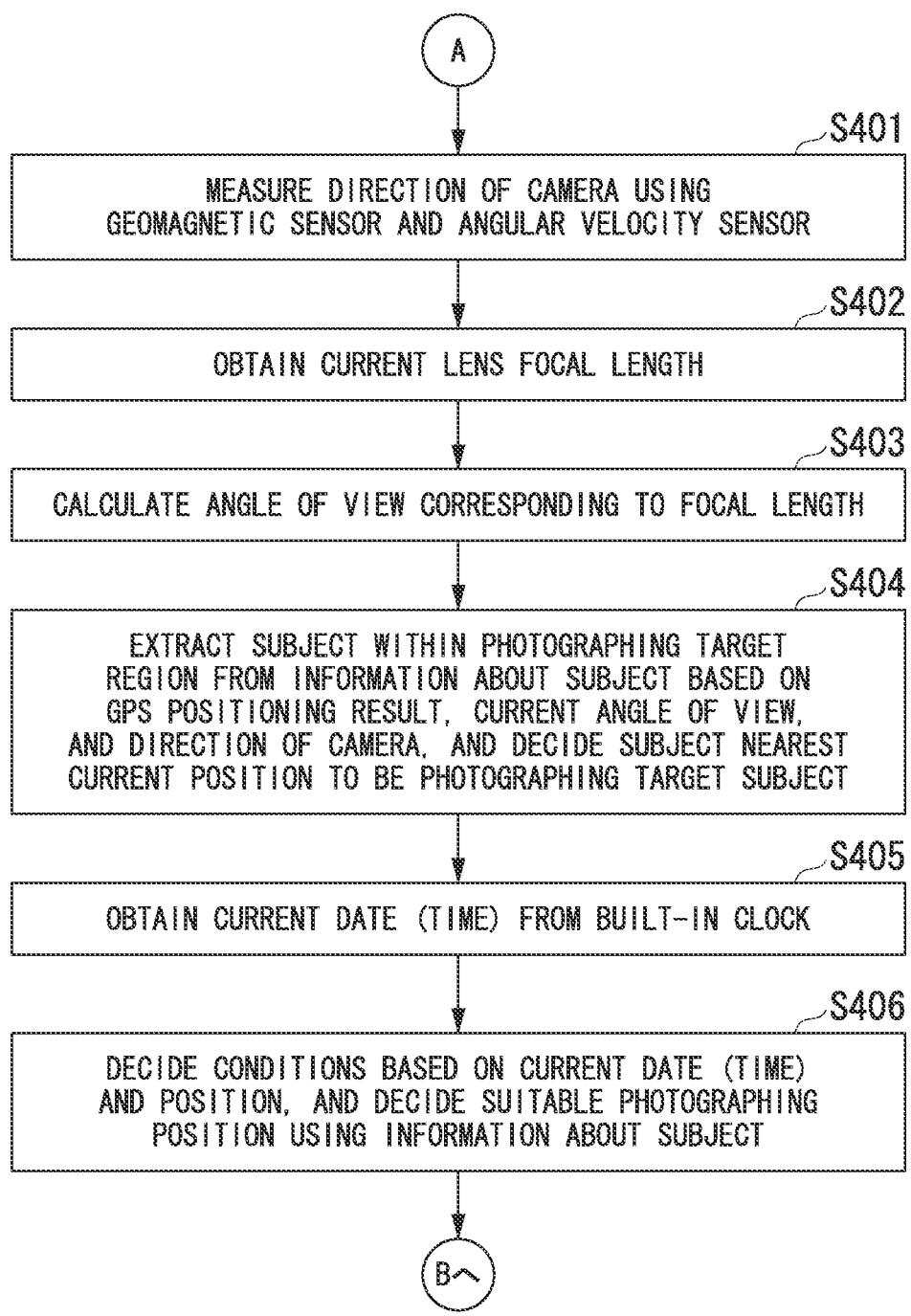
FIG. 4 is a flowchart illustrating a procedure of operation of the camera in accordance with the first preferred embodiment of the present invention.
Figure 7:
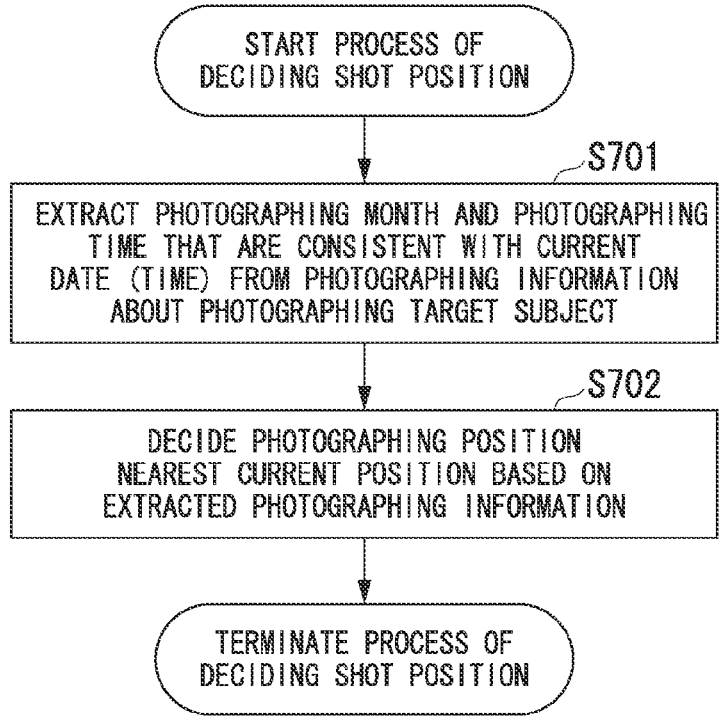
FIG. 7 is a flowchart illustrating a procedure of operation of the camera in accordance with the first preferred embodiment of the present invention.

In step S803, among the subject information stored in the subject information storage unit 211, the azimuth and the elevation angle decided in step S406 of FIG. 4 and in the process of FIG. 7 are compared with current azimuth and elevation angle of the camera 101. If there are a plurality of photographing settings illustrating the photographing direction and the angle of view with respect to the same photographing position, the comparison above is performed on each photographing setting.

The control unit 203 determines whether or not the azimuth and the elevation angle are consistent within an angle range of $\alpha°$ with respect to at least one photographing setting based on the difference of the azimuth and the elevation angle calculated by the calculation unit 210 (step S804). If the azimuth and the elevation angle are consistent within the angle range of $\alpha°$ with respect to all of the photographing settings, the control unit 203 displays the direction indication 1801 (FIGS. 18 and 19) on the display unit 202 in order to prompt the photographer to change the direction of the camera 101 (step S808). Then, depending on the state in which the photographer prepares the camera 101, the guidance is made by moving the display position of the landmark 1802 toward or away from the center 1803.

Further, depending on the measurement precision of the geomagnetic sensor 208 and the angular velocity sensor 209 of the camera 101, the range of $\alpha°$ (e.g. ±5°) within which the angle is considered to be consistent is set in the camera 101 in advance. The process above is terminated, and the display for the guidance is renewed, and then the process returns to step S801.

On the other hand, if the azimuth and the elevation angle are consistent within an angle range of $\alpha°$ with respect to at least one photographing setting, the calculation unit 210 compares the angle of view associated with the azimuth and the elevation angle consistent with those of the camera 101 in the information about the subject with a current angle of view set for the camera 101, and calculates a difference between them (difference in the angle of view) (step S805). The control unit 203 determines whether or not the angle of view is consistent within an angle range of $\beta°$ based on the difference in the angle of view calculated by the calculation unit 210 (step S806).

The range of $\beta°$ within which the angle of view is considered to be consistent is an error in the calculated result obtained by the method of calculating the angle of view described with reference to FIG. 13. The calculated result of the angle of view is relevant to the size of the image capturing plane. The size of the image capturing plane of the camera 101 may be different from the size of the image capturing plane of the camera that has performed photographing operationing as a source of the information recorded in the subject information storage unit 211. Further, since a decimal-point value is typically neglected, if the calculated result includes digits after the decimal point, there is a chance to cause an error of about 1°. Accordingly, if $\beta°$ is set to, for example, 1°, and the angle of view is within this range, the angle of view is determined to be the same angle of view.

Figure 20:
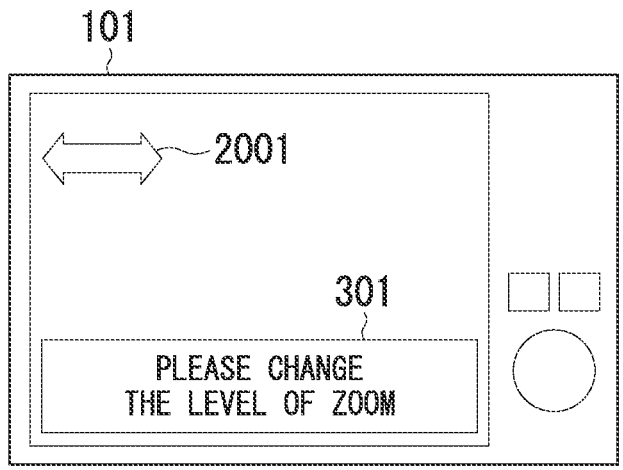
FIG. 20 is a reference diagram illustrating a guiding method in the first preferred embodiment of the present invention.
Figure 21:
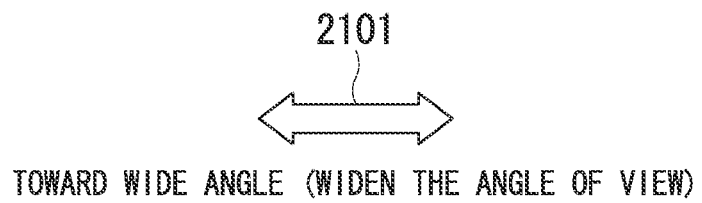
FIG. 21 is a reference diagram illustrating a guiding method in the first preferred embodiment of the present invention.

If the angle of view is consistent within the angle range of $\beta°$, the control unit 203 displays an instruction, which guides the photographer to change the angle of view (focal length) of the camera 101, on the display unit 202 (step S809). A displaying method of guiding the photographer to change the angle of view will be described with reference to FIG. 20. An angle of view adjusting mark 2001 is displayed on a screen of the display unit 202 of the camera 101. For example, when the angle of view needs to be changed to be wider than a current angle of view (toward a wide angle), a mark such as an angle of view adjusting mark 2101 meaning that the angle of view is changed toward the wide angle as shown in FIG. 21 is displayed.

Figure 22:
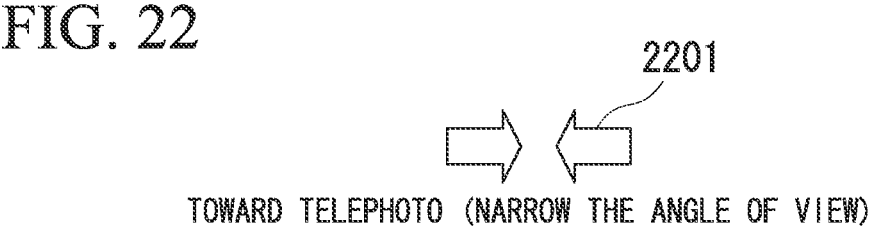
FIG. 22 is a reference diagram illustrating a guiding method in the first preferred embodiment of the present invention.

Further, when the angle of view needs to be changed to be narrower than a current angle of view (toward a telephoto), a mark such as an angle of view adjusting mark 2201 meaning that the angle of view is changed toward the telephoto as shown in FIG. 22 is displayed. In this way, the mark for guiding the change in the angle of view is displayed, the process returns to step S801 again.

On the other hand, if the angle of view is consistent within the angle range of $\beta°$, the control unit 203 displays information informing that the photographing direction and the photographing angle of view are suitable on the display unit 202 (step S807). As this displaying method, for example, there is a method of displaying the direction indication 1801 so that the landmark 1802 overlaps the center 1803 of FIG. 19, and displaying a message meaning that the camera has become suitable for the photographing on the guide display part 1701 of FIG. 18. Further, in terms of this display, for example, an auto output unit may be installed on the camera 101, and announcement based on audio may be made.

With the process above, the photographer can be guided to have a suitable photographing position, photographing direction, and photographing angle of view. In the first preferred embodiment, as shown in FIG. 19, the plurality of different photographing directions are instructed with respect to the same subject. The photographer may select a photographing direction in which a favorite composition is provided from the instructed plurality of photographing directions, and adjust the composition so that the direction of the optical axis of the camera 101 is consistent in the selected photographing direction. Further, when the photographer changes the photographing direction during the adjustment of the composition, he/she may select the landmark different from that used for the composition adjustment from among the plurality of landmarks as shown in FIG. 19, and perform the composition adjustment again. In the meantime, no manipulation but to change the direction of the camera 101 is required.

As described above, according to the first preferred embodiment, information that instructs at least two photographing directions with respect to at least one photographing target is displayed. Thereby, after the photographer arrives at a suitable photographing position, he/she can select any one of at least two photographing directions displayed on the display unit 202 while looking at scenery, and decide the composition. As such, a burden of the manipulation can be reduced. Furthermore, the photographer can be guided so that the photographing direction of the camera 101 becomes suitable to photograph the subject.

Further, as described with reference to FIG. 17, the difference between the position of the subject of the photographing target and the current position of the camera 101 is displayed on the guide display part 1701 as a message. Thereby, the photographer can be guided to a suitable photographing position. Further, the number of steps up to the suitable photographing position is displayed on the guide display part 1701. Thereby, the photographer can intuitively recognize the movement direction and distance.

Further, as described with reference to FIGS. 14 and 15, the subject within the range of the angle of view of the camera 101 is decided as the photographing target. Thereby, even when structures acting as subjects are in close formation, the subjects acting as the photographing targets can be narrowed.

Further, as described with reference to FIGS. 21 and 22, the difference between the angle of view when favorable photographing is performed and the current angle of view of the camera 101 is displayed on the display unit 202 as the angle of view adjusting mark 2101 or 2201. Thereby, the photographer can be guided so that the angle of view of the camera 101 becomes suitable to photograph the subject.

As another embodiment of the present invention, a device having a wireless communication function can share the position information by using a program that realizes the operation flow described in FIGS. 5-10. The device may include a program storage unit (corresponding to the memory unit 310 in FIG. 3). First, the program that realizes the operation flow described in FIGS. 5-10 are generated and stored in the program storage unit (the memory unit 310). If a storage unit of a terminal having the wireless communication function stores image data acquired by image capturing or data communication, then the terminal executes the program and transmits GPS position information according to the flow of FIG. 5. Another terminal having the wireless communication function receives the GPS position information, and attaches the GPS position information to image data stored in the self terminal according to the flow of FIGS. 6 and 7. Similarly, the GPS position information can be required by the process according to the flow of FIGS. 8, 9 and 10.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. An image pickup device comprising:
    a storage unit that maps photographing position information indicating a photographing position of each of a plurality of photographing targets mapped to at least two pieces of target direction information indicating directions of the photographing target based on the photographing position;
    a plurality of sensors, one of the plurality of sensors acquiring apparatus position information indicating a position of the image pickup device and another one of the plurality of sensors acquiring photographing direction information indicating a photographing direction of the image pickup device;
    a calculation unit that selects at least one from among the plurality of pieces of photographing position information stored in the storage unit based on the apparatus position information acquired by the one of the plurality of sensors, and calculates at least two direction differences that are differences between the at least two pieces of target direction information, which are mapped to the selected photographing position information and are stored in the storage unit, and the photographing direction information acquired by the another one of the plurality of sensors; and
    a display unit that displays information corresponding to the at least two direction differences calculated by the calculation unit.

2. The image pickup device according to claim 1, wherein:
    the calculation unit calculates a position difference that is a difference between the selected photographing position information and the apparatus position information; and
    the display unit displays information corresponding to the position difference calculated by the calculation unit.

3. The image pickup device according to claim 1, wherein:
    the calculation unit calculates a first angle of view information indicating a photographing angle of view of the image pickup device and selects the at least one from among the plurality of pieces of photographing position information stored in the storage unit based on the angle of view information and the apparatus position information that is acquired by the the one of the plurality of sensors.

4. The image pickup device according to claim 1, wherein the plurality of sensors includes a geomagnetic sensor and an angular velocity sensor, measures the photographing direction of the image pickup device using the geomagnetic sensor and the angular velocity sensor, and acquires the photographing direction information.

5. The image pickup device according to claim 1, wherein:
    the storage unit stores first angle of view information for each of the photographing targets;

the calculation unit calculates a second angle of view information indicating a photographing angle of view of the image pickup device and an angle of view difference that is a difference between the first angle of view information and the second angle of view information; and the display unit displays information corresponding to the angle of view difference calculated by the calculation unit.

6. The image pickup device according to claim 1, wherein:

the storage unit stores date/time information for each of the photographing targets;

the calculation unit acquires date/time information indicating a current date/time from a built-in clock and selects the at least one from among the plurality of pieces of photographing position information stored in the storage unit based on the date/time information and the apparatus position information that is acquired by the one of the plurality of sensors.

7. A non-transitory storage device storing a program that causes a device, including a memory, a plurality of sensors, and a display, with the memory storing photograph position information indicating a photographing position of each of a plurality of photographing targets mapped to at least two pieces of target direction information indicating directions of the photographing target based on the photographing position, to execute:

an acquisition step of acquiring, with the plurality of sensors, apparatus position information indicating a position of the image pickup device and photographing direction information indicating a photographing direction of the image pickup device;

a calculation step of selecting at least one from among the plurality of pieces of photographing position information stored in the storage unit based on the apparatus position information, and calculates at least two direction differences that are differences between the at least two pieces of target direction information, which are mapped to the selected photographing position information and are stored in the memory, and the photographing direction information; and a display step of displaying, by the display, information corresponding to the at least two direction differences calculated by the calculation unit.

\* \* \* \* \*